(12) United States Patent
Charbit

(10) Patent No.: US 7,907,672 B2
(45) Date of Patent: Mar. 15, 2011

(54) SYNCHRONIZATION METHOD, RECEIVER, NETWORK ELEMENT, COMMUNICATION DEVICE, ELECTRONIC DEVICE, COMPUTER PROGRAM PRODUCT AND COMPUTER PROGRAM DISTRIBUTION MEDIUM

(75) Inventor: Gilles Charbit, Hampshire (GB)

(73) Assignee: Nokia Corporation, Espoo (FI)

( * ) Notice: Subject to any disclaimer, the term of this patent is extended or adjusted under 35 U.S.C. 154(b) by 1113 days.

(21) Appl. No.: 11/526,012

(22) Filed: Sep. 25, 2006

(65) Prior Publication Data

US 2007/0071123 A1  Mar. 29, 2007

(30) Foreign Application Priority Data

Sep. 29, 2005 (FI) .................... 20050977

(51) Int. Cl.
H04K 1/10 (2006.01)
H03D 3/22 (2006.01)
H04J 11/00 (2006.01)

(52) U.S. Cl. .................... 375/260; 370/329; 370/206

(58) Field of Classification Search .................. 375/260, 375/332
See application file for complete search history.

(56) References Cited

U.S. PATENT DOCUMENTS

| | | | | |
|---|---|---|---|---|
| 5,790,604 A | * | 8/1998 | Kelton et al. | 375/344 |
| 6,618,452 B1 | * | 9/2003 | Huber et al. | 375/343 |
| 6,639,906 B1 | * | 10/2003 | Levin | 370/342 |
| 6,690,746 B1 | * | 2/2004 | Sills et al. | 375/316 |
| 2002/0150168 A1 | | 10/2002 | Crawford | |
| 2002/0196731 A1 | * | 12/2002 | Laroia et al. | 370/206 |
| 2003/0063678 A1 | * | 4/2003 | Crawford | 375/260 |
| 2004/0264584 A1 | * | 12/2004 | Labs et al. | 375/260 |
| 2005/0084025 A1 | * | 4/2005 | Chen | 375/260 |
| 2005/0201326 A1 | * | 9/2005 | Lakkis | 370/329 |
| 2007/0030924 A1 | * | 2/2007 | Yu | 375/332 |
| 2007/0036234 A1 | * | 2/2007 | Chen et al. | 375/260 |

OTHER PUBLICATIONS

Beek van de, Jan Jaap, et al., "*ML Estimation of Timing and Frequency Offset in Multicarrier Systems*", Apr. 1996, pp. 1-26.
Landström, David et al., "*Symbol Time Offset Estimation in Coherent OFDM Systems*" IEEE, vol. 50, No. 4, Apr. 2002, pp. 545-549.
Lashkarian, Navid "*Class of Cyclic-Based Estimators for Frequency-Offset Estimation of OFDM Systems*", IEEE vol. 48, No. 12, Dec. 2000, pp. 2139-2149.
Minn, Hlaing, et al., "*A Combined Timing and Frequency Synchronization and Channel Estimation for OFDM*", IEEE, Jun. 20-24, 2004, pp. 872-876.
International Search Report PCT/FI2006/050417 filed Sep. 28, 2006.

* cited by examiner

*Primary Examiner* — Mohammad H Ghayour
*Assistant Examiner* — Sarah Hassan
(74) *Attorney, Agent, or Firm* — Squire, Sanders & Dempsey (US) LLP

(57) ABSTRACT

The invention is related to a synchronization method in a communication system. The invention includes: carrying out a coarse time offset and frequency offset estimation, first estimating errors in the coarse time-offset and frequency offset estimation by using a maximum-likelihood time-offset estimation and joint optimisation of time-offset and frequency-offset, second estimating frequency offset and time offset by using error estimates in a closed tracking loop.

15 Claims, 2 Drawing Sheets

SYNCHRONIZATION METHOD, RECEIVER, NETWORK ELEMENT, COMMUNICATION DEVICE, ELECTRONIC DEVICE, COMPUTER PROGRAM PRODUCT AND COMPUTER PROGRAM DISTRIBUTION MEDIUM

FIELD

The invention relates to a synchronization method, a receiver, a network element, a communication device, an electronic device, a computer program product and a computer program distribution medium.

BACKGROUND

By using OFDM (orthogonal frequency division multiplexing) as a multiplexing method, a frequency-selective channel is converted into parallel frequency flat sub-channels. Sub-carriers have a minimum frequency separation necessary to maintain orthogonality of the corresponding time domain waveforms.

OFDM is a block modulation scheme where a block of N information symbols is transmitted in parallel on N sub-carriers. The duration of an OFDM symbol is N times larger than that of a single-carrier system.

An OFDM modulator can be implemented as an inverse discrete Fourier transform (IDFT) on a block of N information symbols followed by an analog-to-digital converter (ADC). To decrease the effects of intersymbol interference (ISI) caused by channel time spread, each block of N IDFT coefficients may be preceded by a cyclic extension (prefix or postfix) or a guard interval. In a receiver, fast Fourier transform (FFT) may be used in signal processing.

In the receiver of a communication system using OFDM, one of the most challenging tasks is the synchronization of an OFDM signal. The synchronization requires finding symbol timing (a time offset) and carrier frequency offset. In order to find symbol timing, the beginning of a symbol has to be estimated. A carrier frequency has to be synchronized very accurately; otherwise there will be loss of orthogonality between sub-symbols. OFDM systems are very sensitive to carrier frequency offsets since they can only tolerate frequency offsets which are a fraction of the frequency spacing between sub-carriers without degradation in system performance.

BRIEF DESCRIPTION OF THE INVENTION

According to an aspect of the invention, there is provided a synchronization method in a communication system, the method comprising: carrying out a coarse time offset and frequency offset estimation; first estimating errors in the coarse time-offset and frequency offset estimation by using a maximum-likelihood time-offset estimation and joint optimisation of time-offset and frequency-offset; second estimating frequency offset and time offset by using error estimates in a closed tracking loop.

According to another aspect of the invention, there is provided a receiver comprising: means for carrying out a coarse time offset and frequency offset estimation; first estimating means for estimating errors in the coarse time offset and frequency offset estimation by using a maximum-likelihood time-offset estimation and joint optimisation of time-offset and frequency-offset; second estimating means for estimating frequency offset and time offset by using error estimates in a closed tracking loop having an adaptive loop gain.

According to another aspect of the invention, there is provided a network element comprising: means for carrying out a coarse time offset and frequency offset estimation; first estimating means for estimating errors in the coarse time offset and frequency offset estimation by using a maximum-likelihood time-offset estimation and joint optimisation of time-offset and frequency-offset; second estimating means for estimating frequency offset and time offset by using error estimates in a closed tracking loop having an adaptive loop gain.

According to another aspect of the invention, there is provided a communication device comprising: means for carrying out a coarse time offset and frequency offset estimation; first estimating means for estimating errors in the coarse time offset and frequency offset estimation by using a maximum-likelihood time-offset estimation and joint optimisation of time-offset and frequency-offset; second estimating means for estimating frequency offset and time offset by using error estimates in a closed tracking loop having an adaptive loop gain.

According to another aspect of the invention, there is provided an electronic device comprising: means for carrying out a coarse time offset and frequency offset estimation; first estimating means for estimating errors in the coarse time offset and frequency offset estimation by using a maximum-likelihood time-offset estimation and joint optimisation of time-offset and frequency-offset; second estimating means for estimating frequency offset and time offset by using error estimates in a closed tracking loop having an adaptive loop gain.

According to another aspect of the invention, there is provided a computer program product encoding a computer program of instructions for executing a computer process for synchronization, the process comprising: carrying out a coarse time offset and frequency offset estimation; first estimating errors in the coarse time-offset and frequency offset estimation by using a maximum-likelihood time-offset estimation and joint optimisation of time-offset and frequency-offset; second estimating frequency offset and time offset by using error estimates in a closed tracking loop.

According to another aspect of the invention, there is provided a computer program distribution medium readable by a computer and encoding a computer program of instructions for executing a computer process for carrying out synchronization, the process comprising: carrying out a coarse time offset and frequency offset estimation; first estimating errors in the coarse time-offset and frequency offset estimation by using a maximum-likelihood time-offset estimation and joint optimisation of time-offset and frequency-offset; second estimating frequency offset and time offset by using error estimates in a closed tracking loop.

According to another aspect of the invention, there is provided a receiver configured to: carry out a coarse time offset and frequency offset estimation; first estimate errors in the coarse time offset and frequency offset estimation by using a maximum-likelihood time-offset estimation and joint optimisation of time-offset and frequency-offset; second estimate frequency offset and time offset by using error estimates in a closed tracking loop having an adaptive loop gain.

According to another aspect of the invention, there is provided a network element configured to: carry out a coarse time offset and frequency offset estimation; first estimate errors in the coarse time offset and frequency offset estimation by using a maximum-likelihood time-offset estimation and joint optimisation of time-offset and frequency-offset;

second estimate frequency offset and time offset by using error estimates in a closed tracking loop having an adaptive loop gain.

According to another aspect of the invention, there is provided a communication device configured to: carry out a coarse time offset and frequency offset estimation; first estimate errors in the coarse time offset and frequency offset estimation by using a maximum-likelihood time-offset estimation and joint optimisation of time-offset and frequency-offset; second estimate frequency offset and time offset by using error estimates in a closed tracking loop having an adaptive loop gain.

According to another aspect of the invention, there is provided an electronic device configured to: carry out a coarse time offset and frequency offset estimation; first estimate errors in the coarse time offset and frequency offset estimation by using a maximum-likelihood time-offset estimation and joint optimisation of time-offset and frequency-offset; second estimate frequency offset and time offset by using error estimates in a closed tracking loop having an adaptive loop gain.

The invention provides several advantages.

An embodiment of the invention provides a technical solution for joint estimation of time and frequency offsets for synchronization of an OFDM system. The complexity of a receiver according to the embodiment is low and its performance is close to ideal.

LIST OF DRAWINGS

In the following, the invention will be described in greater detail with reference to the embodiments and the accompanying drawings, in which FIG. 1 shows an example of a communication system;

DESCRIPTION OF EMBODIMENTS

Figure 1:
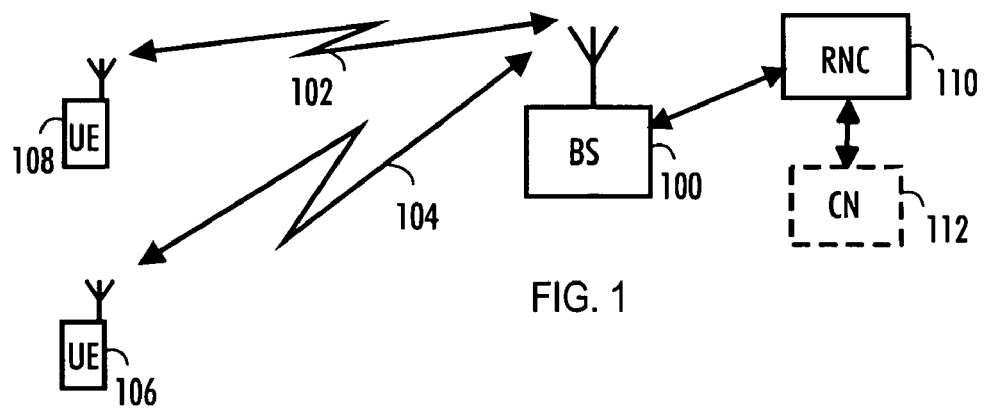

With reference to FIG. 1, we examine an example of a communication system to which embodiments of the invention can be applied. The embodiments of the present invention can be applied to various communication systems utilizing orthogonal frequency division multiplexing (OFDM), such as to a Universal Mobile Telecommunications System (UMTS) radio access network (UTRAN), digital audio broadcasting (DAB), digital video broadcasting (DVB), local area network (LAN), metropolitan area network (MAN) and world-wide interoperability for microwave access (IEEE 802.16 standard WiMAX). The embodiments are not, however, restricted to the systems given as examples but a person skilled in the art may apply the solution to other communication systems provided with the necessary properties.

FIG. 1 is a simplified illustration of a data transmission system to which the solution according to the invention is applicable. This is a part of a cellular radio system which comprises a base station (or node B) 100, which has bi-directional radio links 102 and 104 to user devices 106 and 108. The user devices may be fixed, vehicle-mounted or portable. The base station includes transceivers, for instance. From the transceivers of the base station, a connection is provided to an antenna unit that establishes bidirectional radio links to the user devices. The base station is further connected to a controller 110, a radio network controller (RNC) or a base station controller (BSC), which transmits the connections of the devices to the other parts of the network. The base station controller of the radio network controller controls in a centralized manner several base stations connected to it. The base station controller or the radio network controller is further connected to a core network 112 (CN). Depending on the system, the counterpart on the CN side can be a mobile services switching centre (MSC), a media gateway (MGW) or a serving GPRS (general packet radio service) support node (SGSN), etc.

It should be noticed that in future radio networks, the functionality of an RNC or a BSC may be distributed among (possibly a subset of) base stations.

The communication system can also communicate with other networks, such as a public switched telephone network or the Internet.

In the receiver of a communication system using OFDM, one of the most challenging tasks is the synchronization of an OFDM signal. The synchronization requires finding symbol timing and carrier frequency offset. In order to find symbol timing, the beginning of a symbol has to be estimated. A carrier frequency has to be synchronized very accurately, otherwise there will be loss of orthogonality between sub-symbols. OFDM systems are very sensitive to carrier frequency offsets since they can only tolerate frequency offsets which are a fraction of the frequency spacing between sub-carriers without degradation in system performance.

Sub-carriers remain orthogonal only if a transmitter and a receiver use the same frequencies. A frequency offset results in inter-carrier-interference (ICI). A related problem is a phase noise: an oscillator does not produce a carrier at one frequency, but rather a carrier that is phase modulated by random phase jitter. Since frequency is the time derivative of phase, more ICI is caused in the receiver. Instead, symbol timing may vary over an interval equal to a guard time or the duration of a cyclic extension without causing ICI or inter-symbol interference (ISI).

An OFDM receiver can obtain information for synchronization in two ways: first before demodulation of sub-carriers, either by using training data or from the structure of an OFDM signal, that is to say from a guard interval or cyclic extension, second after demodulation when synchronization information can be obtained from training symbols embedded in a symbol pattern.

Synchronization algorithms for OFDM can be classified into pre-FFT (before modulation) and post-FFT (after modulation) algorithms. The primary goal of pre-FFT processing is to provide information on an FFT window and frequency-offset estimates for frequency correction. Both time and frequency correction are usually carried out before FFT in the time domain for minimising ICI/ISI. The frequency correction may be implemented by a complex multiplication of a received signal with a counter-rotating phase. A coarse time correction may be carried out by shifting the starting point of an FFT frame.

Embodiments of the invention are aimed to pre-FFT signal processing.

Figure 2:
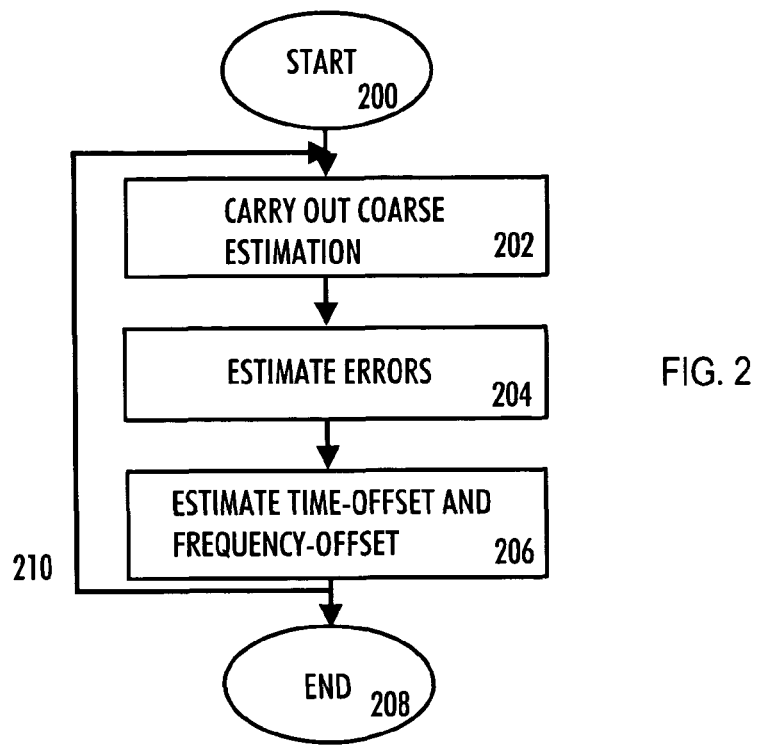
FIG. 2 is a flow chart.

The embodiments of the synchronization method are explained by means of FIG. 2.

The embodiment begins in block 200.

In block 202, a coarse time offset and frequency offset estimation is carried out. The coarse time offset estimation may be a signal peak search and the coarse frequency offset estimation may be defining a phase difference between a guard block and a load part of an orthogonal frequency division multiplexed symbol. The guard block may be a prior art cyclic extension or guard period and the load part means, for instance, a data load of a received signal block.

Signal peak and phase difference detection is known in the prior art and hence they are not explained here in further detail.

It should be noticed that also other coarse time offset and frequency offset estimation methods may be used.

In block 204, errors in the coarse time offset and frequency offset estimation are estimated by using a maximum-likelihood time-offset estimation and joint optimisation of time-offset and frequency-offset.

A maximum-likelihood estimator of a time-offset is generated by using a log-likelihood function. The maximum-likelihood (ML) time-offset error estimate is obtained by maximizing the log-likelihood function over possible coarse time-offset estimates:

$$\tilde{\phi}_{ML} = \arg\max_{\phi} \{\tilde{p}\Lambda_{cp}(\phi) + (1-\tilde{p})\Lambda_p(\phi)\}, \quad (1)$$

wherein $$\Lambda_{cp}(\phi) = \gamma(\phi) - \frac{\tilde{p}}{2}\Phi(\phi) \quad (2)$$

$$= \left| \sum_{k=\phi}^{\phi+N_g-1} r(k)r^*(k+N) \right| - \frac{\tilde{p}}{2} \sum_{k=\phi}^{\phi+N_g-1} |r(k)|^2 + |r(k+N)|^2$$

reflects redundancy in a received signal due to the cyclic extension and $$\Lambda_p(\phi) = \quad (3)$$

$$(1+\tilde{p}) \left| \sum_{k=\phi}^{\phi+N+N_g-1} r^*(k)m(k-\phi) \right| - \tilde{p} \left| \sum_{k=\phi}^{\phi+N_g-1} (r(k)+r(k+N))^* m(-\phi) \right|$$

reflects information carried by the pilot symbols, wherein $$\tilde{p} = \frac{\alpha SNR}{\alpha SNR + 1}, \quad (4)$$

wherein $$\alpha = \frac{N_{use}}{N_p} \quad (5)$$

and $$m(k) = \frac{1}{\sqrt{N}} \sum_{n \in \{P\}} p_n e^{j2\pi kn/N}. \quad (6)$$

By using joint optimisation of time-offset and frequency-offset, the maximum-likelihood estimate of a frequency-offset ratio is:

$$\tilde{\varepsilon}_{ML} = -\frac{1}{2\pi} \angle \gamma(\tilde{\phi}_{ML}) \quad (7)$$

symbols in equations (1) to (7):
arg denotes an argument,
max denotes a maximum value,
φ denotes time offset,
$\Lambda_{cp}(\phi)$ denotes a cyclic-prefix log likelihood function of φ,
$\Lambda_p(\phi)$ denotes a pilot log likelihood function of φ,
γ(φ) denotes a correlation term as a function of φ
$\gamma(\tilde{\phi}_{ML})$ denotes a correlation term as a function of the maximum-likelihood value of φ
Φ(φ) denotes an energy term as a function of φ
$N_g$ denotes the length of a cyclic prefix in samples,
r(k) denotes a time-domain received signal,
r*(k+N) denotes the cyclic extension of a time domain received signal,
N denotes the length of an OFDM symbol (excluding a cyclic prefix),
$N_{use}$ denotes active sub-carriers,
$N_p$ denotes sub-carriers allocated to a pilot signal,
Σ denotes a summing operation,
∥ denotes a magnitude operator,
k denotes a time index,
SNR denotes a signal-to-noise ratio estimated by using a prior art method (SNR estimation is known in the prior art and thus not explained herein),
m(k) denotes a stored time-domain reference pilot signal,
m(k−φ) denotes a stored time-domain reference pilot signal with time delay φ,
n denotes a sub-carrier index,
$p_n$ denotes a pilot value at sub-carrier index n,
$e^{j2\pi kn/N}$ denotes an exponential term of the $n^{th}$ term in the IFFT (inverse fast Fourier transform)
∈ denotes a "belong to" mathematical symbol,
{p} denotes a set of pilots,
√ denotes a square root operation, and
∠ denotes an argument operation.

The function of equation (2) correlates samples spaced N samples apart, thus providing a coarse identification of the position of a cyclic extension. The function of equation (3) contains a filter matched to pilot symbols giving distinct correlation peaks; $\Lambda_p(\phi)$ fine-tunes $\Lambda_{cp}(\phi)$.

The maximum-likelihood estimator of a time offset is partially depicted in Daniel Landstrom, Sarah Kate Wilson, Jan-Jaap van de Beek, Per Ödling and Per Ola Börjesson: Symbol Time Offset Estimation in Coherent OFDM systems, IEEE Transactions on Communications, Vol. 50, No. 4, April 2002, which is incorporated herein as a reference.

In block 206, frequency offset and time offset are estimated in a closed tracking loop by using error estimates. The error estimates are defined in block 204. This phase provides more accurate estimates than the coarse estimation and it is therefore called fine synchronization in this application.

A frequency-offset estimate used for frequency correction is obtained by using a closed tracking loop:

$$\hat{\varepsilon}(m) = \frac{G_{inst}}{G_{ave}} g \hat{\varepsilon}_{ML}(m) + \left(1 - \frac{G_{inst}}{G_{ave}} g\right) \hat{\varepsilon}(m-1), \quad (8)$$

wherein
$G_{inst}$ denotes an instantaneous signal-to-noise ratio estimate,
$G_{ave}$ denotes an average signal-to-noise ratio,
g denotes a fixed loop gain,
$\hat{\varepsilon}_{ML}(m)$ is a maximum-likelihood estimate of a frequency-offset obtained by using equation (7),
$\hat{\varepsilon}(m-1)$ is an ML frequency-offset output of a closed tracking loop for a previous OFDM symbol.

The frequency-offset may be removed from a received signal as follows:

$$\tilde{r}(t) = r(t) \times e^{(-j2\pi\hat{\epsilon}(m)\Delta f)}, \quad (9)$$

wherein
r(t) denotes a time-domain received signal,
x denotes a multiplication operation,
$e^{(-j2\pi\hat{\epsilon}(m)\Delta f)}$ denotes an exponential term,
$\hat{\epsilon}(m)$ denotes a fractionally estimated frequency error term, and
$\Delta f$ denotes sub-carrier spacing.

A time-offset estimate, $\hat{\phi}(m)$, is used for time-offset correction of a frame index m of a received signal. It is obtained by using a closed tracking loop in a similar manner to that of the frequency correction:

$$\hat{\phi}(m) = \frac{G_{inst}}{G_{ave}} g \hat{\phi}_{ML}(m) + \left(1 - \frac{G_{inst}}{G_{ave}} g\right) \hat{\phi}(m-1), \quad (10)$$

wherein
$G_{inst}$ denotes an instantaneous signal-to-noise ratio estimate,
$G_{ave}$ denotes an average signal-to-noise ratio,
g denotes a fixed loop gain,
$\hat{\phi}_{ML}(m)$ denotes an estimated time error term at the $m^{th}$ OFDM symbol, and
$\hat{\phi}(m-1)$ denotes an estimated time error term at the $(m-1)^{th}$ OFDM symbol.

The time-offset may be removed from a received signal by delaying or advancing the signal in a circular buffer by using a time-offset estimate $\hat{\phi}(m)$; typically, if the time-offset is negative, then the signal is delayed and if the time-offset is positive, the signal is advanced. Time-offset removal may be carried out once at the beginning of each frame.

The embodiment ends in block 208. Arrow 210 depicts one possibility for repeating the embodiment, for instance for a following frame.

It should be noted that the embodiment described above enables the maintaining of time and/or frequency synchronization without a need to run a coarse synchronization; in other words, once synchronization by using a coarse synchronization and fine synchronization has been attained, only fine synchronization is needed in the maintenance phase.

On the other hand, a training sequence dedicated for coarse synchronization may be used in fine synchronization. A cyclic prefix and pilots dedicated to the channel estimation are also usable. These options provide improved performance compared with prior art synchronization methods and simplifies the maintaining of the synchronization.

The embodiment also provides a possibility of using fractional carrier offset estimation up to half a sub-carrier spacing. Remarkable is also the fact that, depending on the accuracy of a crystal component used to generate a system clock, an integer carrier-offset estimation (typically carried out during coarse synchronization) is not required.

Figure 3:
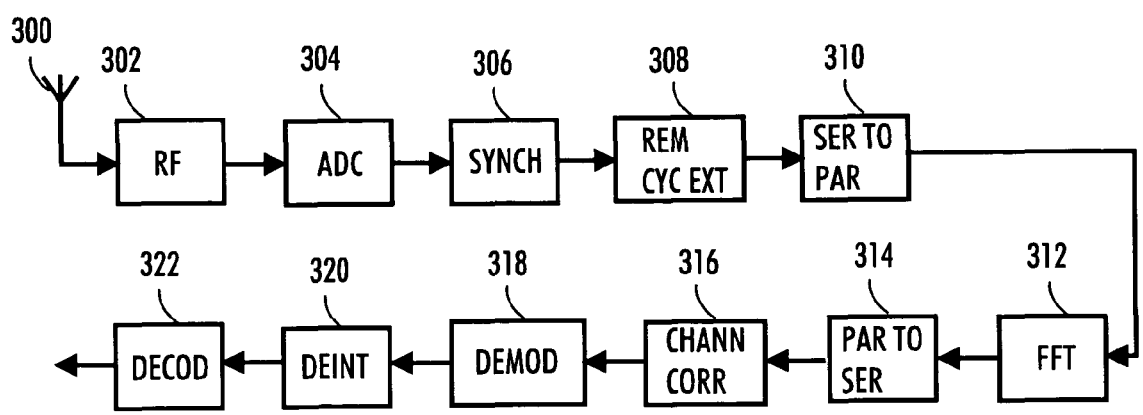
FIG. 3 illustrates an example of a network element.

FIG. 3 shows a simplified example of a part of a receiver. The receiver may be located in a network element, such as a base station, or in another kind of a communication device, such as a user terminal. It is obvious to a person skilled in the art that the structure of a receiver may vary from what is depicted in FIG. 3.

The receiver includes antenna 300 which may be a single antenna or an antenna array having several antenna elements. Radio frequency parts 302 include a power amplifier for amplifying a received signal for processing and filters. Analog-to-digital converter 304 converts a received analog signal to a digital form for digital signal processing. Synchronization, which was explained above, is carried out in block 306. Cyclic extension is removed in block 308 and the data is converted from a serial form to a parallel form (block 310) for fast Fourier transform (FFT), which in turn is carried out in block 312; FFT is used as an OFDM demodulator.

In block 314, the data is converted back to a serial form and conveyed to channel correction 316, which typically includes for example a channel equalizer. Data modulation is removed in block 318. Demodulation is carried out according to current modulation. Several prior art modulation methods exist.

De-interleaving is carried out in block 320 and channel decoding in block 322. Then the signal is conveyed to other parts of the receiver (not shown).

Figure 4:
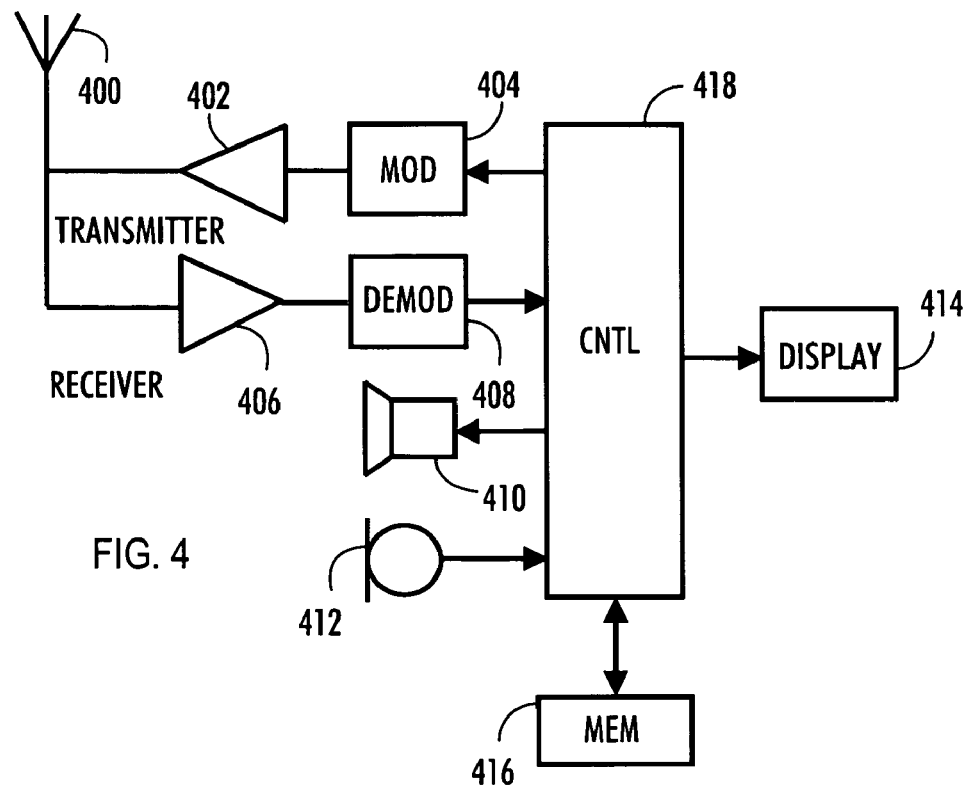
FIG. 4 illustrates an example of a communication device.

FIG. 4 shows a simplified example of a user terminal whereto the embodiments of the invention can be applied. The user terminal is taken herein as an example of a communication device. The user terminal may be a mobile telephone or a microcomputer, for example, without being restricted thereto.

The user terminal comprises an antenna 400 with which signals are both transmitted and received via a duplex filter. The terminal further comprises a transmitter 402 to amplify and transmit a modulated signal to the antenna, a modulator 404 modulating the carrier wave by a data signal comprising the desired information in accordance with a selected modulation method, a receiver 406 which amplifies the signal supplied from the antenna and down-converts the signal to a selected intermediate frequency or directly to base band, and a demodulator 408 demodulating the received signal to enable a data signal to be separated from the carrier wave.

The user terminal also comprises a control block 418 comprising, for example, control and calculation means for controlling the operation of the different parts of the terminal, means for processing the speech of a user or the data generated by the user, such as a digital signal processing (DSP) processor comprising, for example, channel correction functions compensating for interference in the signal caused by the radio channel, A/D converters converting an analogue signal into a digital one by sampling and quantizing the base band signal, D/A converters converting a digital signal to an analogue one by a reverse method, filters at the receiver which filter frequencies outside a desired frequency band or, which in band-restricted systems restrict the band width of the output at the transmitter, and coding and decoding means for both channel and speech coding.

Furthermore, in spread-spectrum systems, such as wideband code division multiple access (WCDMA used in UMTS) systems, the spectrum of the signal is spread at the transmitter by means of a pseudo-random spreading code over a wide band and despread at the receiver, in an attempt to increase the channel capacity.

The user interface of the terminal comprises a loudspeaker or an earpiece 410, a microphone 412, a display 414 and possibly a keypad and/or a joystick or a similar device. The user interface devices communicate with the control block. In FIG. 4, a memory block 416 is also depicted.

The embodiments of the synchronization method can mainly be implemented by software storable in the control block including instructions for executing a computer process for carrying out a coarse time offset and frequency offset estimation, first estimating errors in the coarse time-offset and frequency offset estimation by using a maximum-likelihood time-offset estimation and joint optimisation of time-offset and frequency-offset, second estimating frequency offset and time offset by using error estimates in a closed tracking loop.

Different hardware implementations are also feasible, e.g. a circuit built of separate logics components or one or more client-specific integrated circuits (Application-Specific Integrated Circuit, ASIC). A hybrid of software and hardware implementations is also feasible.

The embodiments of the synchronization method can also be implemented as a module that may be installed, for instance, in a communication device.

Figure 5:
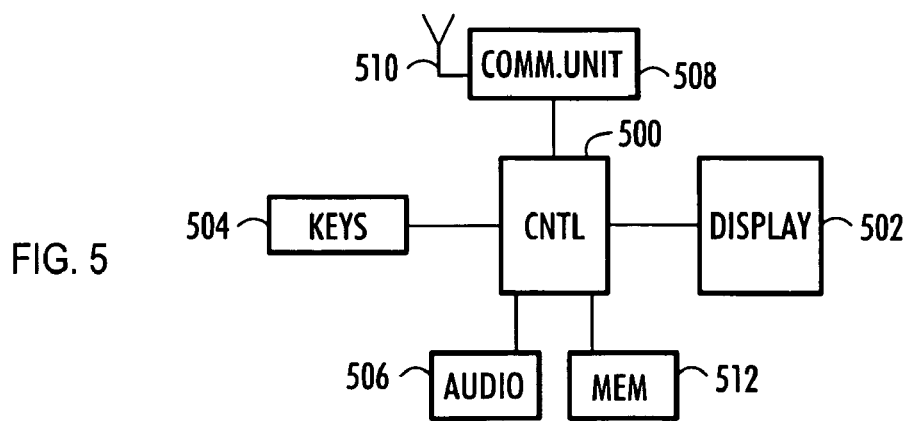
FIG. 5 illustrates an example of an electronic device.

With reference to FIG. 5, an example of an electronic device is examined to which embodiments of the invention can be applied. The device may be a personal computer or another device configured to wireless communication.

The electronic device comprises controller 500, typically implemented with a microprocessor, a signal processor or separate components and associated software. The device further comprises display 502. The display is typically configured to display graphics and text. The device also comprises keyboard 504. Depending on the type of the device, there may be a different number of user interface parts, such as a mouse, a touch pad or any other corresponding input device, as one skilled in the art is aware.

The device may also comprise an audio interface 506, which typically comprises a microphone and a loudspeaker. The device may also comprise memory 512. The device may also comprise communication unit 508 implementing the functions of terminal equipment including speech and channel coders, modulators and RF parts. In some embodiments, the device may also comprise an antenna 510.

The embodiments of the synchronization method can mainly be implemented by software storable in the controller and/or communication unit including instructions for executing a computer process for carrying out a coarse time offset and frequency offset estimation, first estimating errors in the coarse time-offset and frequency offset estimation by using a maximum-likelihood time-offset estimation and joint optimisation of time-offset and frequency-offset, second estimating frequency offset and time offset by using error estimates in a closed tracking loop.

Different hardware implementations are also feasible, e.g. a circuit built of separate logics components or one or more client-specific integrated circuits (Application-Specific Integrated Circuit, ASIC). A hybrid of software and hardware implementations is also feasible.

The embodiments of the synchronization method can be implemented by software including instructions for executing a computer process for carrying out a coarse time offset and frequency offset estimation, first estimating errors in the coarse time-offset and frequency offset estimation by using a maximum-likelihood time-offset estimation and joint optimisation of time-offset and frequency-offset, second estimating frequency offset and time offset by using error estimates in a closed tracking loop.

The computer program may be stored on a computer program distribution medium readable by a computer or a processor. The computer program medium may be, for example but not limited to, an electric, magnetic, optical, infrared or semiconductor system, device or transmission medium. The medium may be a computer readable medium, a program storage medium, a record medium, a computer readable memory, a random access memory, an erasable programmable read-only memory, a computer readable software distribution package, and a computer readable compressed software package.

Even though the invention is described above with reference to an example according to the accompanying drawings, it is clear that the invention is not restricted thereto but it can be modified in several ways within the scope of the appended claims.

The invention claimed is:

1. A method, comprising:
determining a coarse time-offset and a coarse frequency-offset estimation;
estimating errors in the coarse time-offset and the coarse frequency-offset estimation, wherein the errors are estimated by using a maximum-likelihood time-offset estimation and a joint optimization of time-offset and frequency-offset;
estimating a frequency-offset and a time-offset based on the error estimates in a closed tracking loop; and
removing the time-offset from a received signal by delaying or advancing the received signal in a circular buffer by using the time-offset estimate.

2. The method of claim 1, further comprising:
generating the maximum-likelihood time-offset estimation by maximizing a log-likelihood function over possible coarse time-offset estimates.

3. The method of claim 1, further comprising:
determining the frequency offset estimation as follows:

$$\hat{\varepsilon}(m) = \frac{G_{inst}}{G_{ave}} g \hat{\varepsilon}_{ML}(m) + \left(1 - \frac{G_{inst}}{G_{ave}} g\right) \hat{\varepsilon}(m-1),$$

wherein
$G_{inst}$ denotes an instantaneous signal-to-noise ratio estimate,
$G_{ave}$ denotes an average signal-to-noise ratio,
g denotes a fixed loop gain,
$\hat{\varepsilon}_{ML}(m)$ is a maximum-likelihood estimate of a frequency-offset, and
$\hat{\varepsilon}(m-1)$ is an maximum-likelihood frequency-offset output of a closed tracking loop for a previous orthogonal frequency division multiplexed symbol.

4. The method of claim 1, further comprising:
determining the time offset estimation as follows:

$$\hat{\phi}(m) = \frac{G_{inst}}{G_{ave}} g \hat{\phi}_{ML}(m) + \left(1 - \frac{G_{inst}}{G_{ave}} g\right) \hat{\phi}(m-1),$$

wherein
$G_{inst}$ denotes an instantaneous signal-to-noise ratio estimate,
$G_{ave}$ denotes an average signal-to-noise ratio,
g denotes a fixed loop gain,
$\hat{\phi}_{ML}(m)$ denotes an estimated time error term at the $m^{th}$ orthogonal frequency division multiplexed symbol, and
$\hat{\phi}(m-1)$ denotes an estimated time error term at the $(m-1)^{th}$ orthogonal frequency division multiplexed symbol.

5. An apparatus, comprising:
a processor;
memory including computer program instructions;
the memory and the computer program instructions configured to, working with the processor, cause the apparatus to perform at least the following:
determine a coarse time offset and a coarse frequency offset estimation;
estimate errors in the coarse time offset and the coarse frequency offset estimation, wherein the errors are estimated by using a maximum-likelihood time-offset estimation and a joint optimization of time-offset and frequency-offset;

estimate frequency offset and time offset based on the error estimates in a closed tracking loop having an adaptive loop gain; and remove the time-offset from a received signal by one of delaying the signal in a circular buffer or advancing the signal in a circular buffer, by using the time-offset estimate.

6. The apparatus of claim 5, wherein the receiver is further configured to generate the maximum-likelihood time-offset estimation by maximizing a log-likelihood function over the coarse time-offset estimates.

7. The apparatus of claim 5, wherein the receiver is further configured to determine the frequency offset estimation as follows:

$$\hat{\varepsilon}(m) = \frac{G_{inst}}{G_{ave}} g \hat{\varepsilon}_{ML}(m) + \left(1 - \frac{G_{inst}}{G_{ave}} g\right) \hat{\varepsilon}(m-1),$$

wherein $G_{inst}$ denotes an instantaneous signal-to-noise ratio estimate, $G_{ave}$ denotes an average signal-to-noise ratio, g denotes a fixed loop gain, $\hat{\varepsilon}_{ML}(m)$ is a maximum-likelihood estimate of a frequency-offset, and $\hat{\varepsilon}(m-1)$ is an maximum-likelihood frequency-offset output of a closed tracking loop for a previous orthogonal frequency division multiplexed symbol.

8. The apparatus of claim 5, wherein the receiver is further configured to determine the time offset estimation as follows:

$$\hat{\phi}(m) = \frac{G_{inst}}{G_{ave}} g \hat{\phi}_{ML}(m) + \left(1 - \frac{G_{inst}}{G_{ave}} g\right) \hat{\phi}(m-1),$$

wherein $G_{inst}$ denotes an instantaneous signal-to-noise ratio estimate, $G_{ave}$ denotes an average signal-to-noise ratio, g denotes a fixed loop gain, $\hat{\phi}_{ML}(m)$ denotes an estimated time error term at the $m^{th}$ orthogonal frequency division multiplexed symbol, and $\hat{\phi}(m-1)$ denotes an estimated time error term at the $(m-1)^{th}$ orthogonal frequency division multiplexed symbol.

9. The apparatus of claim 5, wherein the apparatus comprises a network element.

10. The apparatus of claim 5, wherein the apparatus comprises a communication device.

11. The apparatus of claim 5, wherein the apparatus comprises an electronic device.

12. A computer program embodied on a computer-readable medium comprising a computer program of instructions for executing a computer process for synchronization, the process comprising:

determining a coarse time offset and a coarse frequency offset estimation;

estimating errors in the coarse time-offset and frequency offset estimation, wherein the errors are estimated by using a maximum-likelihood time-offset estimation and a joint optimization of time-offset and frequency-offset;

estimating frequency offset and time offset based on the error estimates in a closed tracking loop; and removing the time-offset from a received signal by delaying or advancing the received signal in a circular buffer by using the time-offset estimate.

13. The computer program embodied on the computer-readable medium of claim 12, wherein the computer-readable medium comprises at least one of a program storage medium, a record medium, a computer readable memory, a computer readable software distribution package and a computer readable compressed software package.

14. An apparatus, comprising:

determining means for determining a coarse time offset and a coarse frequency offset estimation;

error estimating means for estimating errors in the coarse time offset and the coarse frequency offset estimation, wherein the errors are estimated by using a maximum-likelihood time-offset estimation and a joint optimization of time-offset and frequency-offset;

offset estimating means for estimating frequency offset and time offset based on the error estimates in a closed tracking loop having an adaptive loop gain; and removing means for removing the time-offset from a received signal by delaying or advancing the received signal in a circular buffer by using the time-offset estimate.

15. The apparatus of claim 14, wherein the determining means, error estimating means, offset estimating means, and removing means are comprised in a receiver.

* * * * *